United States Patent [19]

Toma et al.

[11] 4,107,491
[45] Aug. 15, 1978

[54] WELDING MACHINE SPACER PLATE WITH SENSORS

[75] Inventors: Charles A. Toma, Warren; Walter F. Haessly, Salem, both of Ohio

[73] Assignee: The Taylor Winfield Corporation, Warren, Ohio

[21] Appl. No.: 678,154

[22] Filed: Apr. 19, 1976

[51] Int. Cl.² .............................................. H01H 3/60
[52] U.S. Cl. .................................................. 200/61.42
[58] Field of Search ............... 200/52 R, 61.41, 61.42; 219/79, 80, 81

[56] References Cited

U.S. PATENT DOCUMENTS

| | | | |
|---|---|---|---|
| 3,319,087 | 5/1967 | Wintriss | 200/61.42 X |
| 3,368,056 | 2/1968 | Garver et al. | 200/61.41 X |
| 3,780,242 | 12/1973 | Bendror | 200/61.41 |
| 3,838,241 | 9/1974 | Weismann | 219/80 X |

Primary Examiner—James R. Scott
Attorney, Agent, or Firm—William J. Ruano

[57] ABSTRACT

A spacer plate construction for use in selective spacing between the head end and tail end of strips to be welded end-to-end by a welding machine.

Sensors in the form of spring biased pivotal (or otherwise moveable) elements are mounted in longitudinally spaced cavities in the spacer plate to assure that the strip ends are held flush against the spacer plate before clamping for subsequent flash or butt welding. It is only when the sensor elements are moved inwardly to the sides of the spacer plate sufficiently to actuate a proximity switch mounted within the sensor plate that a circuit for initiating clamping of the head end and tail end of the strips can be initiated for subsequent welding.

2 Claims, 4 Drawing Figures

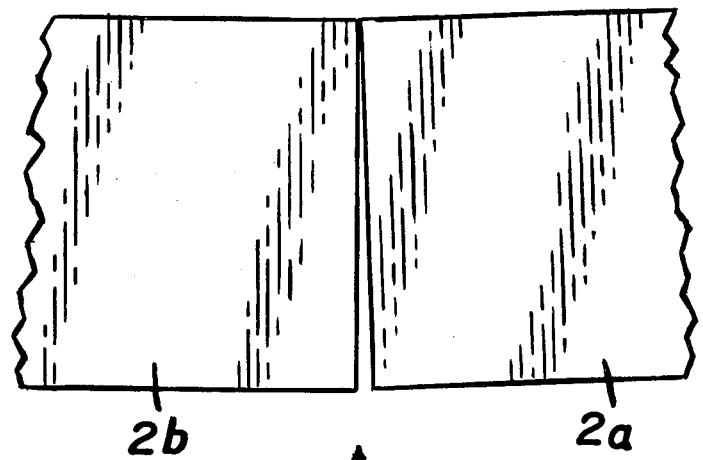
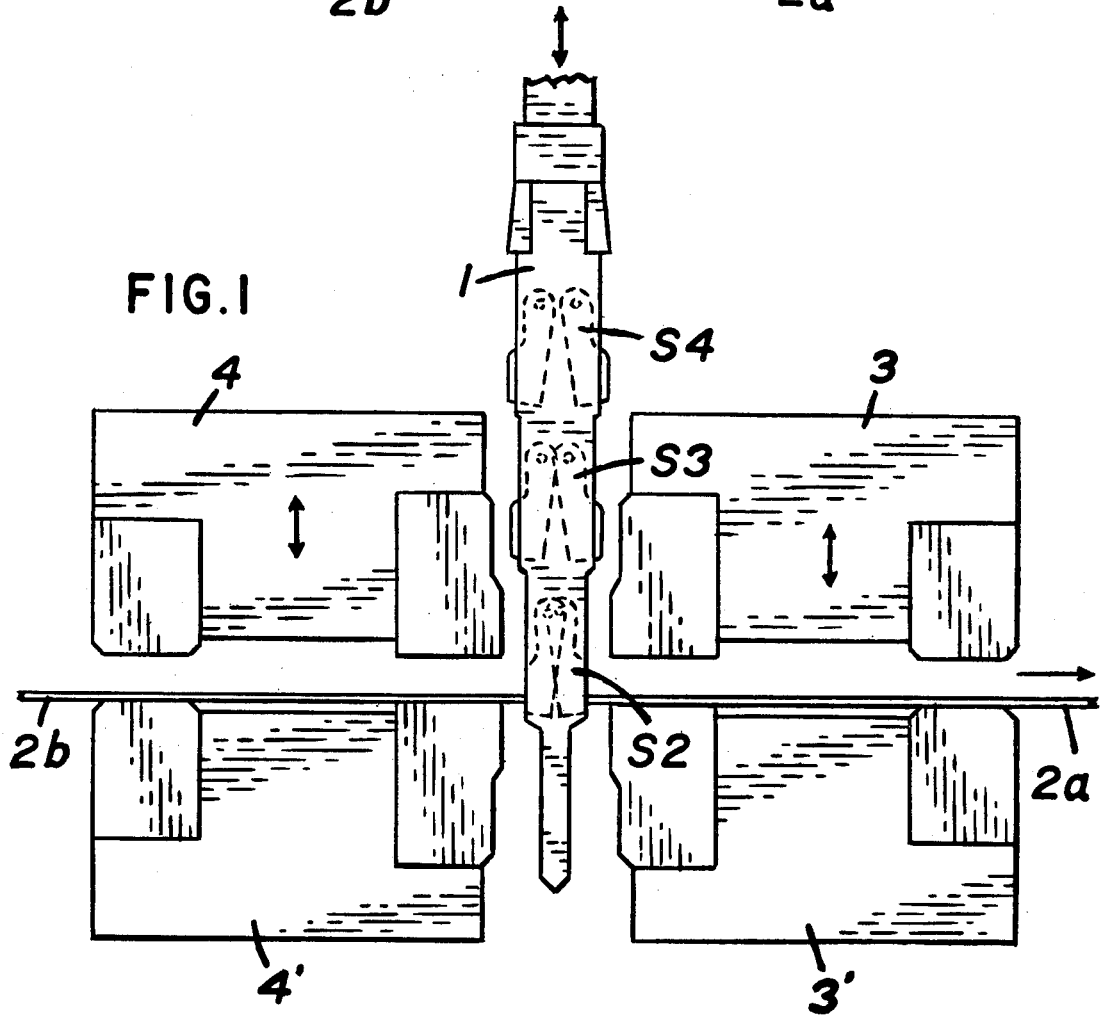

SPACER PLATE CENTER LINE

WELDING MACHINE SPACER PLATE WITH SENSORS

BACKGROUND OF THE INVENTION

This invention relates to a spacer plate construction for a welding machine for welding strips end-to-end.

Most resistance welding machines, in present use, employ a solid, multiple step, spacer plate of varying widths longitudinally as a means of obtaining selective separations of the coil or strip ends when clamped for subsequent welding for a given weld schedule.

The spacer plate is a flat plate which is stepped longitudinally on both sides. These steps will determine the amount of the strip end that will protrude beyond its respective welding die for a particular weld schedule, depending upon the thickness of the sheet, the particular sheet material and other factors. Such spacer plate is described in Cooper et al. U.S. Pat. No. 3,249,732 dated May 3, 1966 and Seeloff et al. U.S. Pat. No. 2,794,111 dated May 28, 1957.

Referring more particularly to FIG. 1 of the drawings, the tail end of the coil 2a is positioned beyond the exit welding dies 3 and 3'. The spacer plate 1 (exclusive of the interior parts labeled S2, S3, and S4 of the present invention) is lowered, and the preselected step or width is positioned between the clamps and strip ends 2a and 2b. The direction of travel of the tail end of the coil or strip is reversed in order to butt the strip end 2a against the spacer plate 1.

The correct positioning of the strip end 2a against the spacer plate 1 is determined only by the operator's visual inspection which, at best, is difficult and often unreliable. At the operator's satisfaction, the head end 2a of the strip is clamped between the exit upper welding die 3 and the exit lower welding die 3'.

The head end 2b of a new coil is positioned against the spacer plate 1 and clamped between the entry upper welding die 4 and entry lower welding die 4', in the same manner as used on the tail end 2a.

On completion of clamping both strip ends 2a and 2b, the spacer plate 1 is removed. The strip ends 2a and 2b are brought together and the operator visually inspects the relationship of the ends with each other. If a gap exists at one side, as shown in FIG. 2, the clamped strip ends 2a and 2b must be released and the complete procedure of spacing and clamping must be repeated, resulting in considerable loss of time and production.

SUMMARY OF THE INVENTION

An object of the present invention is to overcome the above-named disadvantages of prior solid spacer plates by providing sensor elements within the spacer plate embodying the features of the present invention.

A more specific object of the invention is to provide novel pivotal or otherwise moveable elements, embodying the present invention, within longitudinally spaced cavities in different widths or steps of the spacer plate to provide a positive and reliable indication of a butting relationship between the strip ends and the sides of the spacer plate before clamping by the dies is possible, thereby making the operation reliable and fool proof.

BRIEF DESCRIPTION OF THE DRAWINGS

Other objects and advantages of the invention will become more apparent from the following description, taken with the following drawings, wherein:

FIG. 1 is an elevational view of a portion of a flash-butt welding machine equipped with a spacer bar embodying the present invention;

FIG. 2 is a top or plan view showing an incorrect relative position between the strips ends, preparatory to clamping by the welding dies.

DESCRIPTION OF THE PREFERRED EMBODIMENTS

Figure 3:
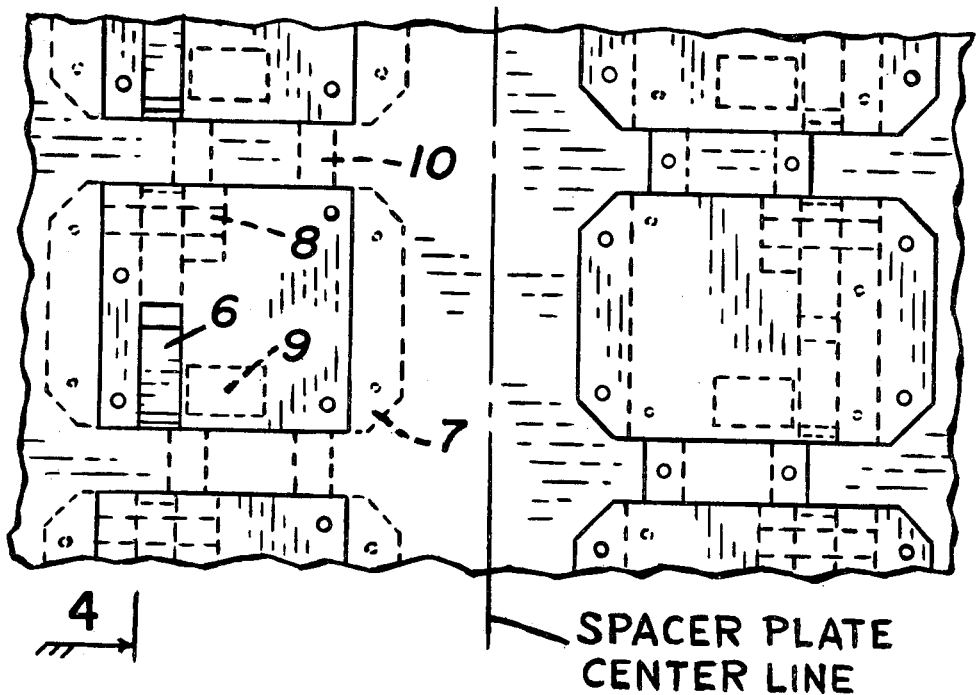
FIG. 3 is an enlarged elevational view showing one of the sensor units of the present invention shown in FIG. 1.
Figure 4:
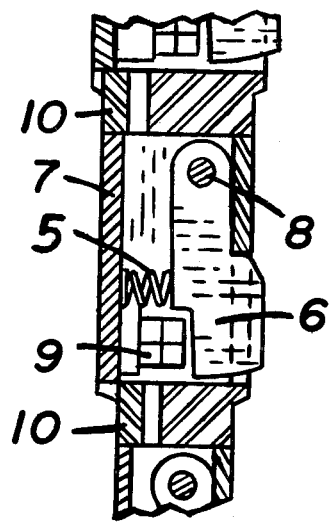
FIG. 4 is a cross-sectional view taken along lines 4—4 of FIG. 3.

The above-mentioned time-consuming procedure of strip end spacing and clamping by using a solid spacer bar of well known construction can be greatly reduced and possibly eliminated with the addition of the sensing units S2, S3, and S4 of the present invention, shown, in FIGS. 1, 3 and 4, which are built into the spacer plate 1.

The sensing spacer plate 1 of the present invention is a flat plate into which has been machined a number of cavities for containing the sensor units.

Mounted in each of the thicker steps are a pair of mechanically operated, sensing switch units S2, S3 and S4. The units are so mounted that sensing is done from both sides of the spacer plate 1 for a selected step or width as illustrated in FIG. 4.

OPERATION

In operation, after the tail end 2a of the coil passes beyond the exit welding dies 3, 3', the spacer plate 1 is lowered to the selected step containing either sensor S2, S3 or S4, depending upon the amount of separation desired between the strip ends. The travel of the coil is reversed so that the tail end 2a butts up against the spacer plate 1. If the metal strip end 2a is properly positioned flushly against the spacer plate 1, as in $S_2$, the sensing finger 6, loaded by spring 5 mounted in the sensor housing 7, will be pivoted inwardly about its pivot pin 8 and across the face of the proximity switch 9 of any well known type. Such switch will close an electrical automatic strip end clamping circuit (not shown) or perhaps only a pilot circuit for merely lighting a pilot lamp. As shown in FIG. 3, preferably two spaced sensors are provided on each step of plate 1.

If the tail end 2a of the coil, when butted up against the spacer plate 1, was not positioned correctly (as shown in FIG. 2), the clamping function could not be performed, since the circuit would remain interrupted by the spring biased, normally open proximity switch 9. The operator would be made aware of this and would then have to re-adjust the strip end 2a by pushing it flushly against the spacer plate 1 so that the sensor switch could be closed. The head end 2b of the new coil is handled in the same manner as the tail end.

When both strip ends have been automatically clamped in their respective welding dies, by completion of an energizing circuit through both of the closed sensor switches 9 on each side of plate 1, the spacer plate 1 is removed. The strip ends 2a–2b are then brought together for joining by welding without the presence of the undesireable gap shown in FIG. 2.

In order to insure extended trouble-free operation of the sensor units under the adverse conditions of flash-butt welding, compressed air is directed into each sensor housing 7(FIG. 4) via the opening in connecting block 10 inserted between housings. Airborne grit is thereby prevented from accumulating in the sensor housings 7.

Instead of providing a pivotal sensing finger 6, the pivot 8 could be omitted, in some applications and an additional spring 5 could be substituted therefor alongside thereof, whereby the finger 6 would move laterally in a straight line, instead of along an arc.

Other types of sensing switches could be used in place of proximity type. However, it is felt that they would be less reliable and more difficult to adjust.

In other situations, two sensing units could be located on each side of the spacer plate and positioned so that contact is made relatively close to the strip edges. The energizing circuit for the clamping welding dies will include both of such sensor switches in series, whereby only when both switches are closed on each side of said spacer plate, the energizing circuit will be completed.

The benefit received when using the sensing spacer plate of the present invention will be the assurance of flush connection between strip ends, increased production due to the decrease of lost time in strip end clamping, as well as increased repeatability of producing quality welds.

Thus it will be seen that we have provided a highly efficient and reliable sensor system in a spacer plate which assures that the ends of the strips are flush against the sides of the spacer plate before clamping and which is fool-proof in the sense that if they are not flush, the energizing circuit for the clamp will not be completed since the corresponding sensor switch would remain open under such circumstances; furthermore, we have provided a highly improved spacer plate assembly and sensor system that assures high quality welds and much speedier production, therefore, eliminating time-consuming faults and carelessness of the operator which are very costly in the production of continuous metal coils.

While we have illustrated and described several embodiments of our invention, it will be understood that these are by way of illustration only and that various changes and modifications may be contemplated in our invention and within the scope of the claims.

I claim:

1. For use in a welding machine, a spacer bar for selectively spacing the amount of projection of metal strip ends beyond two pairs of welding clamps on opposite sides of said bar, before welding the ends of the strip ends together to insure that the strip ends are flushly positioned before welding, said spacer bar comprising steps on opposite sides throughout its length to provide longitudinal portions of varying widths of the bar to vary the extent of projection of the strip ends beyond the ends of said two pairs of welding clamps, an opening inside each of the stepped sides of different width, a pair of pivotally mounted switch actuating elements on each side of said bar within each opening, spring means normally biasing the free end of said switch actuating elements beyond the sides of said bar, a proximity switch located in each cavity adjacent to and inward of said free end so as to be actuated upon retraction of said free end of said switch actuating element inwardly of the cavity in which it is located to complete an energizing circuit to clamp the associated pair of clamps together, thereby assuring that the strip ends projecting beyond the clamps are flush before they are welded together.

2. A spacer bar as recited in claim 1 together with pressure admission ports at the top and bottoms of said cavities to permit the flow of air under pressure to remove metal particles which accumulate in the cavity.

* * * * *